Nov. 16, 1937.  A. D. EDGINGTON  2,099,471
HARVESTER ATTACHMENT
Filed March 5, 1937  3 Sheets-Sheet 1
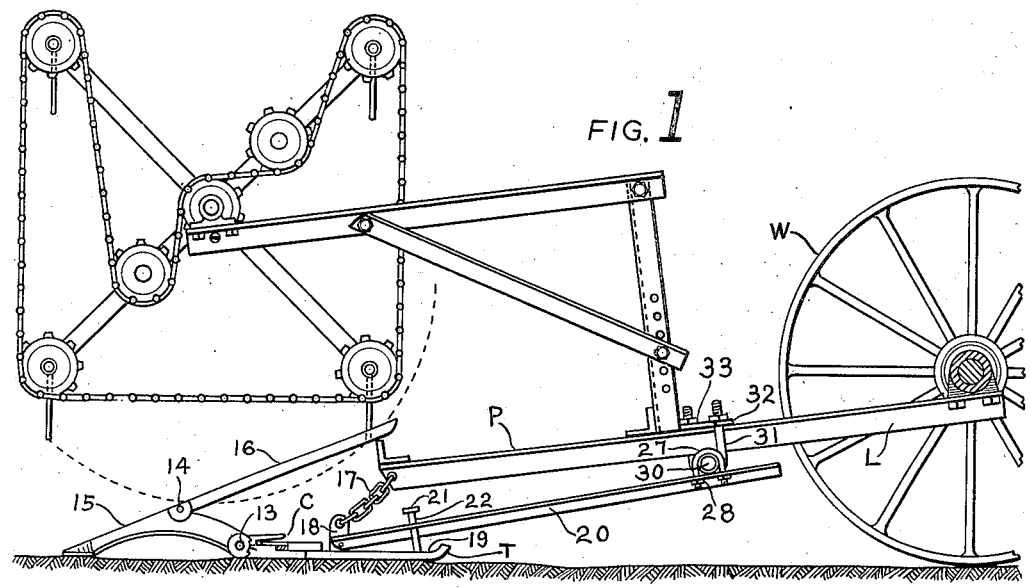
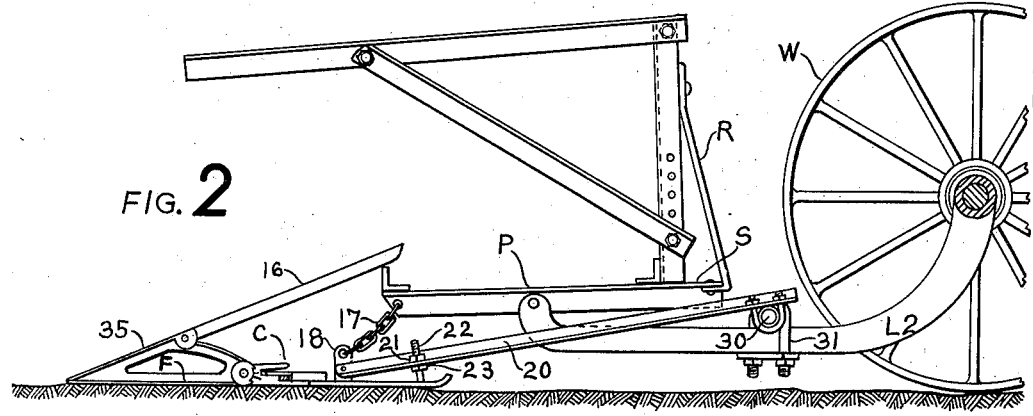
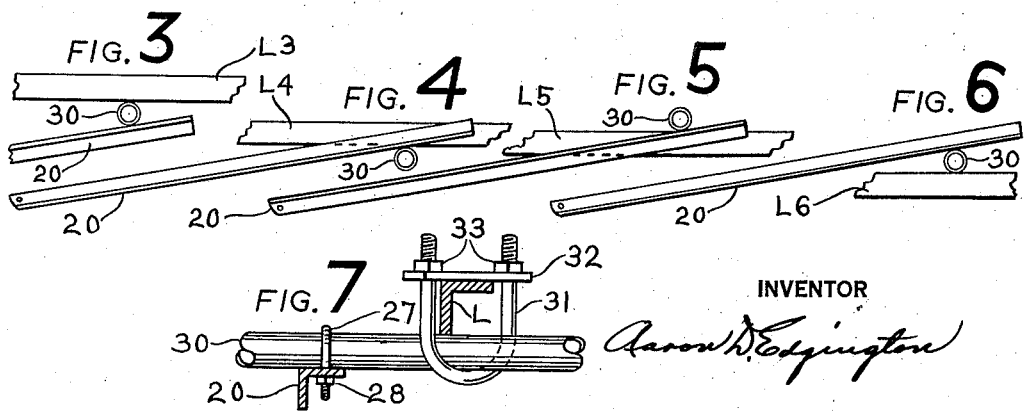
INVENTOR
Aaron D. Edgington Nov. 16, 1937.  A. D. EDGINGTON  2,099,471
HARVESTER ATTACHMENT
Filed March 5, 1937  3 Sheets-Sheet 2
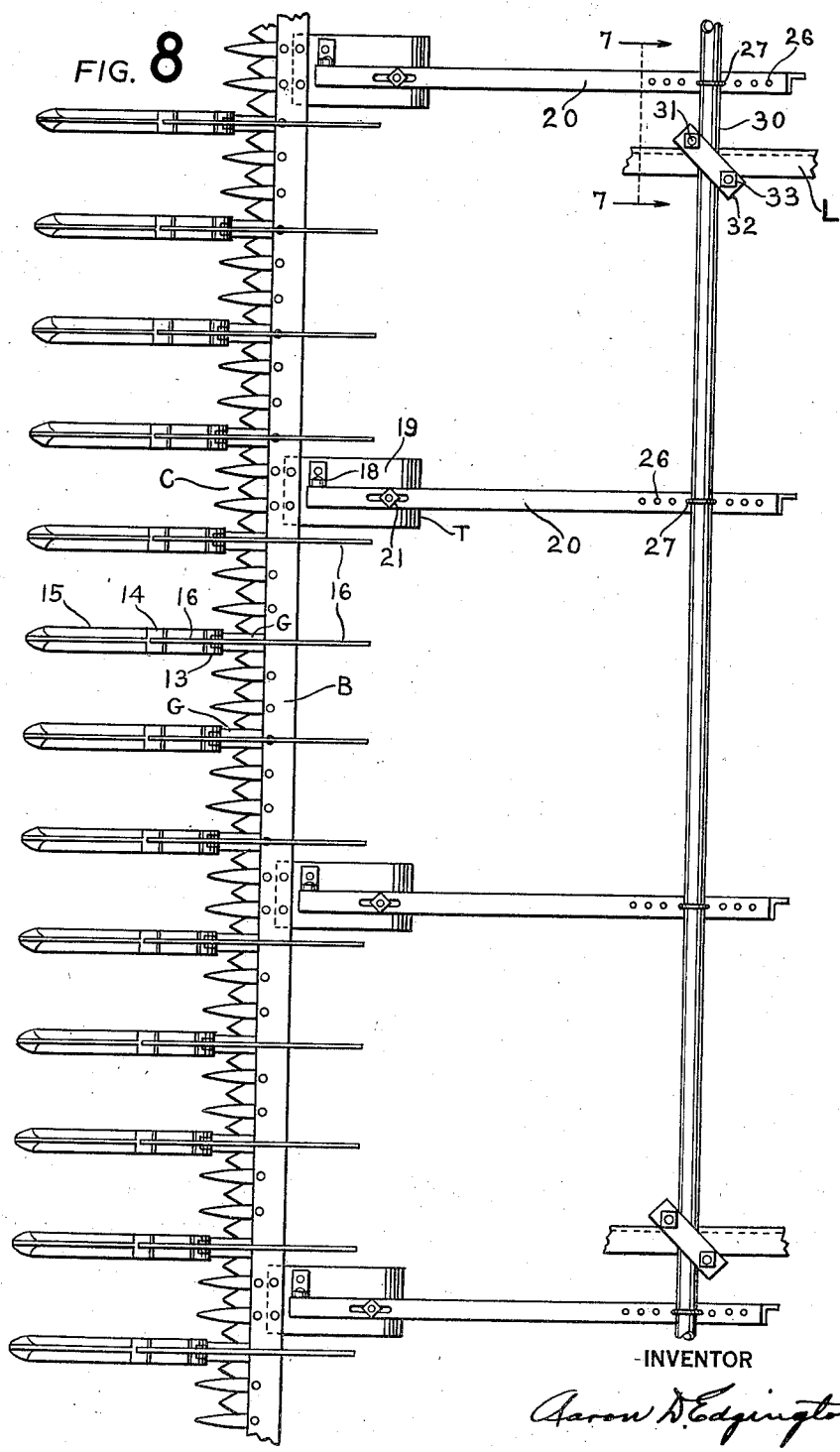
INVENTOR
Aaron D. Edgington

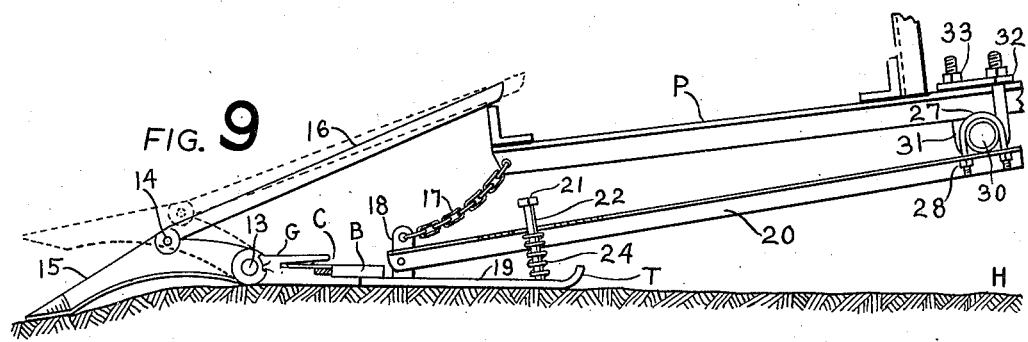
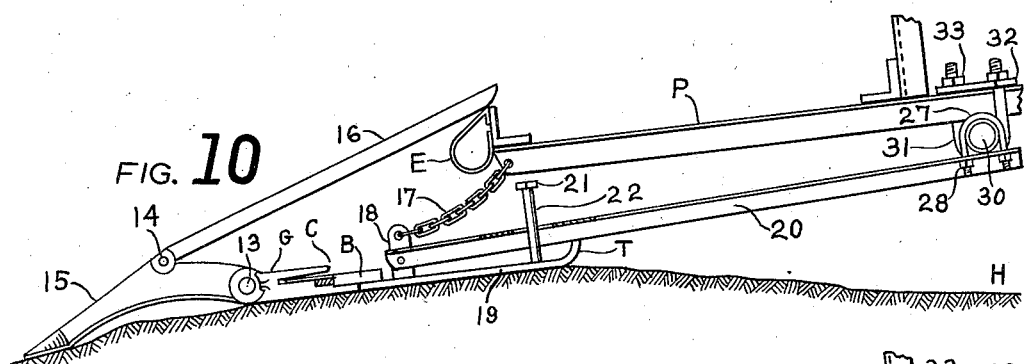
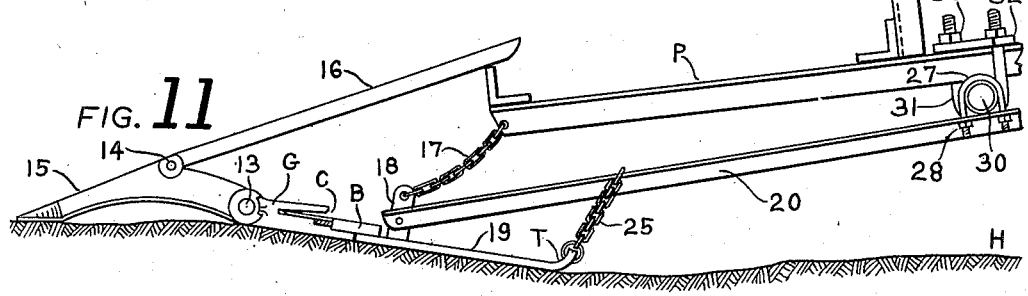
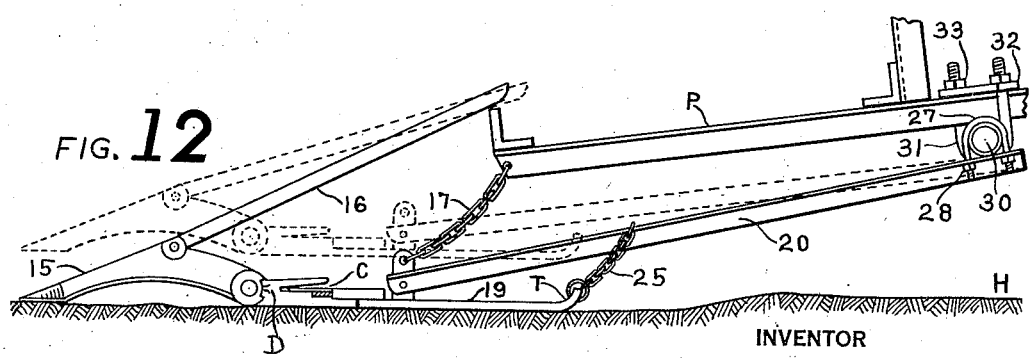

Patented Nov. 16, 1937

2,099,471

UNITED STATES PATENT OFFICE 2,099,471

HARVESTER ATTACHMENT

Aaron D. Edgington, Cheney, Wash., assignor to Cheney Weeder Company, Cheney, Wash., a corporation of Washington Application March 5, 1937, Serial No. 129,214

10 Claims. (Cl. 56—312)

The present invention relates to certain new and useful improvements in a harvester attachment for the particular purpose of harvesting peas and similar vine crops.

Where peas are grown on large acreage, it is advantageous to harvest and thresh them with the conventional combine. Due to the fact that at the harvest time the pea vines lie close to the ground, a combine is not adapted to cut the vines sufficiently near to the ground, and considerable of the peas are lost in the field. To overcome this difficulty, the prior art has devised various means for hinging the cutting device to the combine platform by means of push bars of sufficient length to position the cutting device slightly in advance of the platform, and various means have been devised to provide for the passage of the cut vines upward to the platform, from whence the draper conveys them to the threshing mechanism.

In thus transforming the combine for the purpose of harvesting peas, there is encountered considerable difficulty. The short abrupt rise from the cutting device to the draper platform causes the vines to lodge and necessitates speeding up the reel to urge the vines over onto the draper platform. Due to the fact that at harvest time the peapods are exceedingly dehiscent, the agitation required to carry the vines over the short abrupt rise, threshes out considerable of the pods and the peas are lost in the field.

Another difficulty encountered is due to the fact that the cutting device must of necessity skid over the ground, and the variations in contour of the ground results in repeated variations of the distance between the cutting device and the draper platform, thus presenting a particular problem of satisfactorily bridging this variable gap. For harvesting peas, it is the general custom to use a flexible cutting device comprising a reciprocating sickle with guards attached to a flexible guard bar, and this advantageous expedient results in linear inequalities in the variations just mentioned, due to the fact that the rise and fall of the cutting device is variable throughout its length.

Another difficulty encountered is due to the fact that in the several different combines in general use, the draper platform has but little frame work and affords only limited opportunity for hinging the cutting device thereto. This fact presents an inconvenience in installing a cutting device hingedly to the draper platform and also necessitates the drilling of numerous holes for bolting the required hangers to the platform.

The present invention presents an improved device of this class, which can with facility be attached to the various conventional combines by means of U-bolts requiring no drilling of holes, and the device can be removed therefrom with equal facility when it is desired to use the combine for harvesting wheat or other grains. The device of my invention can with facility be transferred from one combine to another, free from the inconvenience of removing the hanger members employed by the prior art.

According to my invention the device is attached to the lever arms of the header axle, and all strain and stress from skidding the cutting device over the ground, is removed from the platform which was built to carry its own load only. I provide an improved construction which is readily adaptable to the variations in height of said lever arms in various combines and thereby eliminate the necessity of different manufacture to accommodate different combines, thus effecting considerable saving in the cost of production and consequent economy for the benefit of the user.

My invention also provides an improved means for lifting the vines for efficient cutting and for bridging the variable gap between the cutting device and the draper platform of the combine. The improved construction is such that the vines pass over a continuous support, and in this manner I obviate the difficulty of vines lodging between the vine lifting means and gap bridging means of the prior art.

My improved construction is such that the gap bridging means coacts with the platform and the vine lifting means, in such a manner that the weight of the vines causes the gap bridge means to actuate the vine lifting means, and the latter also actuates the former as the contour of the ground varies. Furthermore, when the contour of the ground causes the cutting device to rise and fall, this motion coacts with the platform to actuate the gap bridging means which in turn actuates the vine lifting means, and the latter will also actuate the gap bridging means independently of the rise and fall of the cutting device. In this manner, I have devised an improved construction wherein the several parts cooperatively interact in mutual relationship to produce the proper function and result.

In the prior art, the cutting device was set at some particular angle with relation to the push bars, so that the cutting device would be parallel with the ground surface in the path of travel. This construction sufficed only when the path of travel was a constant plane; but when the ground wheels encountered a rise, the cutting device plowed into the ground, due to the fact that the sickle guards were then angled towards the ground. The same difficulty was encountered when the cutting device encountered low ground, and the plowing continued until the ground wheels arrived at the same general plane as the cutting device. When the cutting device encountered a rise, it again continued to plow into the ground until the ground wheels arrived at the same general plane as the cutting device. This plowing into the ground not only dulled the sickle knives by the action of abrasive elements in the earth, but also bent the sickle guards out of proper alignment; and also, the increased draft of the plowing put additional stress upon the device as a whole and its attachment to the combine.

In the prior art constructions, when the ground wheels encountered low ground, there was the objectionable effect of directing the cutting device upward and away from the ground, thus defeating the prime purpose of cutting close to the ground. The skid shoes essentially necessary on cutting devices of this nature, exaggerated the objectionable effect of directing the cutting device away from the ground when the ground wheels encountered low ground; and furthermore, the rear ends of the skid shoes then gouged along in the ground adding to the stress upon the push bars and upon their attachment to the combine.

My invention embodies an improved construction, wherein the cutting device will travel parallel with the ground surface, either on the general plane; or, when the ground wheels encounter a rise; or when the cutting device encounters low ground; or when the cutting device encounters a rise; or when the ground wheels encounter low ground. This improved construction coacts with the push bars, vine lifters and gap bridging means to produce a unitary result, eliminating the various inaptitudes of the prior art.

In the accompanying drawings I illustrate the practical embodiment of my invention as developed by extensive experience in the commercial manufacture of devices of this kind.

Figure 1 is an end view of a harvester platform and reel, showing my invention in operative position.

Figure 2 shows a different relationship of attachment.

Figures 3, 4, 5 and 6 diagrammatically illustrate accommodations for various heights of attachment while maintaining the same angle of the push bars.

Figure 7 shows an enlarged section on the line 7—7 of Fig. 8.

Figure 8 is a plan view of the invention separate.

Figures 9, 10, 11 and 12 illustrate different movements of the invention in operation, and include minor modifications.

In the drawings, the letter C is used to collectively indicate the cutting device comprising the sickle slidably mounted in its guards which are secured to the guard-bar B in any practical manner, usually by bolts. At spaced intervals, modified guards G are employed, and a lifting finger 15 is pivoted to each of these modified guards. A rearwardly extending prong 16 is pivoted to each lifting finger. A number of ground shoes 19 are rigidly secured to the guard-bar B, usually by bolts. The described parts are intended to be skidded over the ground, and the shoes 19 suffice as skid plates to favorably support the cutting device upon the ground. For this purpose, the shoes 19 are preferably made relatively short and broad.

A long shoe is objectionable for the reason of its delay in passing from higher to lower ground, and a narrow shoe is objectionable for the reason that it cuts into the ground and fails to provide proper support.

The cutting device is skidded over the ground by means of push bars 20 pivoted thereto. Each push bar 20 may be pivoted to a suitable bracket applied to the guard-bar B; but preferably, an upstanding bracket 18 is rigid with each shoe 19, and a push bar 20 is pivoted to each of these brackets. These push bars extend rearwardly in parallel relation, and the rear ends of the several push bars are hingedly connected to a cross rail 30. Preferably, the cross rail 30 is a metal pipe, and the several push bars 20 are each hingedly connected thereto by means of a U-bolt 27 which saddles the cross rail 30 and passes through holes 26 in the push bar 20, suitable nuts 28 being employed to hold the parts snugly together, and yet provide for hinge movement in operation.

The previously described construction is shown as a unit in Fig. 8 where I have indicated a section shown in enlarged detail in Fig. 7, illustrating the simplified means of attaching the entire unit to a harvester or combine, by means of two U-bolts. As shown in Fig. 7, a U-bolt 31 obliquely saddles the cross rail 30 and straddles the support L, a tie plate 32 is clamped tightly against the support L by means of nuts 33 and the cross rail 30 securely held in fixed relation with the support. It will be seen that this construction is indeed simple and affords a quick and easy means for attaching the complete unit to various supports of different shapes and sizes.

The invention is employed as supplemental equipment for converting the conventional combine into a pea harvester. There is considerable variation in the construction of these harvester combines, and the present invention is particularly adapted to accommodate the wide variety of constructions found in the header unit of the various combines in general use.

In Fig. 1 and Fig. 2, I have indicated two different types of header platforms. In either instance, the header platform is supported by means of a pair of lever arms L, which are carried by the axle of the ground wheel W, and suitable means not here shown, is provided for raising and lowering the platform, all of which is common knowledge. In Fig. 1, the lever arms L are rigid with the platform P and relatively high from the ground. In Fig. 2, the lever arms L2 are underslung and pivotally connected to the platform which brings the lever arms relatively near to the ground. In the latter form, suitable instrumentalities, are employed to control the inclination of the platform as it is raised and lowered; and these well known expedients are not here shown.

I have shown the present invention differently attached to the two extremes in Fig. 1 and Fig. 2. In Fig. 1, the cross rail 30 is positioned below the lever arm L and the push bars 20 are positioned below the cross rail 30, to afford appropriate angle of the push bars 20, it being obvious that too much inclination of the push bars would produce an unnecessary amount of traction resistance. In Fig. 2, the cross rail 30 is positioned above the low lever arms L2 and the push bars 20 are positioned above the cross rail 30. It will be seen that the inclination of the push bars 20 in Fig. 2 is exactly the same as in Fig. 1, thus providing the same operating condition in each of these widely different situations. In the absence of such provision, the push bars 20 will have a different inclination when assembled on different machines, and whatever member is used to connect the rear of the shoe 19 to the push bar 20, either rigidly or movably, there will need to be a difference in length of such connecting member for each different inclination of the push bars 20, which results in much inconvenience to the manufacturer and to the user. For instance, in Fig. 2 where the shoe 19 is held in fixed relation to the push bar 20, mounting the latter below the lever arm L2 will angle the front of the shoe upward and hold the sickle off the ground, thus defeating the prime purpose of cutting close to the ground. In other instances the reverse would be true, and the sickle would be inclined downward and objectionably gouge into the ground. It will also be seen that if the assembly shown in Fig. 1 were transferred to Fig. 2, then the inclination of the push bars 20 would be lessened and the intended free movement of the pivoted shoe would be hampered. With the improved construction disclosed, it is conveniently possible to provide a single construction which will suffice for the different conditions met in practice, and obviate the necessity for alterations to meet each different condition.

In Figures 3, 4, 5 and 6, I have diagrammatically illustrated four modes of attachment to lever arms of different heights while maintaining the push bars 20 at the same inclination in each instance; and in instances where necessary, the additional holes 26 shown in Fig. 8, may be employed to effect minor differences in inclination of the push bars 20. It will also be readily understood, that with any given height of lever arms or other support, should occasion require that the inclination of the push bars 20 be altered to accommodate any particular condition, such can be readily accomplished by altering the mode of arrangement as indicated in Figures 3, 4, 5 and 6.

The device shown in Fig. 8 can conveniently and quickly be attached to the harvester unit of any conventional combine, the cross rail 30 being clamped either to the lever arms, or to any other suitable members projecting from the platform. Most platforms have a number of beams such as S which project rearwardly from the platform and carry brace arms such as R. The cross rail 30 can be clamped to each of these beams S, thereby affording as many points of attachment as there happens to be beams. In each instance, the spacing of the supporting members is irrelevant; and also no drilling of holes is required.

The cross rail 30 is clamped to whatever suitable supports the platform happens to possess, and the cutting device is disposed below and forwardly of the platform and connected thereto by suitable cables or chains 17, whereby the cutting device is free to rise and fall as it skids over the ground surface, the range of movement being indicated in Fig. 12.

To further accommodate the cutting device to changes in the contour of the ground, the cutting device C and the shoes 19 are pivoted to the push bars 20, and the hinge movement thus provided is restricted to the desired range, by any suitable means. In Fig. 9 I have shown a post 22 carried by the shoe 19 and passed through a slot in the push bar 20, the head or nut 21 restricting the downward movement of the rear end of the shoe 19. A compression spring 24 may be employed as a cushion between the shoe and the push bar, and the several springs may be made sufficient to weigh the forwardly projecting parts of the cutting device, this construction being particularly serviceable when the chains 17 are connected direct to the push bars 20. As shown in Fig. 10, the springs may be entirely omitted if desired.

The upward movement of the shoe may be restricted either by a second nut on the post 22, or by either a suitable projection, or else bend in the post 22. Preferably, I limit the upward movement by means of the upturned end T on the shoe 19, the rise of the upturned end being made sufficient to impinge the push bar and thus restrict the hinge movement of the cutting device.

The post 22 may be supplanted by a suitable length of chain 25 connecting the shoe with the push bar in the manner shown in Fig. 11. The range of hinge movement of the shoe is illustrated in Fig. 10 and Fig. 11 where it will be seen that the cutting device readily conforms to either ascending or descending ground.

For the purpose of lifting the cutting device by raising the platform, the latter is connected thereto by means of chains 17 which may be connected in any practical manner, either to the cutting device, or to the push bars. Preferably, the bracket 18 extends a short distance above the push bar 20 and the chain 17 is connected to the upper end of this bracket. When thus connected, raising of the platform will rock the cutting device on its pivots and incline the front end thereof upwardly, which is advantageous when the cutting device is lifted for the purpose of making turns, as the weight of the cutting device would otherwise cause it to incline downwardly from its pivots, unless weighed by springs such as 24.

The cutting device is provided with a series of lifting fingers 15 pivotally connected to occasional modified guards G. The lifting fingers have a free hinge movement both above and below the plane of the cutting device, so that the free end of each lifting finger may reach ground either above or below the plane of the cutting device. The range of hinge movement of the lifting fingers may be restricted in any practical manner, as for instance, by the notch and lug indicated at D in Fig. 12.

The spring generally employed to urge the lifting finger downward, is not employed, and instead, the lifting finger is urged downward by the weight of the crop upon the prong 16 which is pivotally connected to the lifting finger, and the free end of this prong extends to the platform to bridge the gap between the lifting finger and the platform, to provide a continuous support for the vines as they pass from the ground to the platform. For this purpose, it is essentially necessary that the pivotal attachment of the prong 16 be forward of the pivotal attachment of the lifting finger 15, otherwise the weight of the crop upon the prong 16 would raise the free end of the lifting finger instead of urging it downward.

Preferably, the prong 16 is pivoted to the lifting finger 15, at a point slightly rearward of the mid-length of the lifting finger, or at about one-third the length of the lifting finger, as is indicated at 14. When the pivotal point of the prong 16 is thus located, the hinge movements of the lifting finger will make but slight differences between the inclination thereof and the inclination of the prong 16, while if the pivotal point 14 is placed more rearwardly, there will be an abrupt angle formed by the prong 16 and the lifting finger 15, when the latter moves upwardly about its pivot 13. Vines will lodge in an abrupt angle and be impeded in their progress to the platform, and consequently it is essential that such inaptitudes be avoided by locating the pivot 14 in the described position. In Figures 9, 10, 11 and 12 where various movements of the device are illustrated, it will be seen that the described construction minimizes the difference in angle between the prong 16 and the lifting finger 15, and thus provides a nearly uniform incline for the passage of vines in the various positions which the device assumes in passing over variations in the contour of the ground.

The prong 16 is here shown as a piece of strap metal pivotally mounted on edge; however, a similar piece of material may be pivotally mounted flatwise, or else a rounded rod may be formed with an eye for pivotal attachment to the lifting finger in the previously described manner.

The lifting finger 15 may take various forms, but preferably, it consists of an upwardly arched member as shown in Figures 1, 9, 10, 11 and 12, where it will be seen that the arch is sufficient to clear a minor elevation in the ground, or a small obstruction, either of which would otherwise elevate the lifting finger and cause the point thereof to pass over the vines instead of under as intended. The upper edge of the lifting finger is suitably inclined to correspond with the average inclination of the prong 16 which bridges the gap between the lifting finger and the platform.

Where the contour of the ground is quite regular, the lifting finger may be devoid of the arch and be of the frame like construction illustrated at 35 in Fig. 2 where a bottom member F connects the front and rear of the lifting finger. Where this form of lifting finger is employed, the cutting device may be held rigid, as is also shown in Fig. 2, such provisions being adequate for reasonably level ground.

In the utilization and employment of my invention, it is attached to the header platform, in the previously described manner, as shown in Fig. 1. The necessary reel is positioned so that its tines sweep quite close to the platform as indicated by the dotted line in Fig. 1, where it will be seen that the tines sweep well below the prongs 16 which bridge the gap between the lifting fingers and the platform. From this figure, it will be seen that the usual movements of the cutting device will not leave a gap between the path of the tines and the prongs 16, and that efficient engagement of the tines with the vines is assured. It will also be seen that the usual rise of the cutting device will not cause the tines to become engaged with the sickle, which would of course damage the latter, such being a frequent accident with prior art constructions.

The reel should be turned at about the same rate as ground travel, so that as the harvester passes over the ground, the vines will be gradually passed back onto the platform. Since the vines load the prongs 16, the lifting fingers 15 will be urged downward and in close contact with the ground so as to effectively engage under the vines which usually lie close to the ground at harvest time. The lifting fingers having a hinge movement below the plane of the cutting device they will effectively reach minor depressions in the ground and effectively pick up the vines growing therein. The lifting fingers being arched, the tip thereof will promptly seek each depression and gather the vines therein, as will be apparent from Fig. 9, where it will be seen that a flat bottom lifting finger in the same situation would still be on the same plane as the cutting device and would fail to pick up the vines on this low ground. It is well known that because of moisture drain to these depressions in the ground, the yield therein is greater than on the immediately adjacent higher ground, and it will be readily appreciated that the present invention assures harvesting this better yield which would otherwise be lost in the field in the absence of the improved construction of the present invention.

When the cutting device arrives at a decline, it will conform thereto as shown in Fig. 10, where the free end of the lifting finger 15 is also shown at a lower level than the cutting device. In the situation here shown, it will be readily understood that a cutting device held in fixed relation to the push bars 20 and carrying lifting fingers limited to not hinge below the plane of the cutting device, then the cutting device and the lifting fingers would lie in the plane of the general ground level H, and that the lifting fingers and cutting device would be considerably above the vines until the plane of the ground became generalized. Much loss of seeds is experienced from this cause, in prior art devices.

In Fig. 11, the cutting device is shown ascending inclined ground and with the lifting finger on the general plane of the ground indicated at H. In such situations, a cutting device held in fixed relation to the push bars 20, would ascend such an incline with difficulty, due to the fact that the cutting device would gouge into the ground until it reached the top of the incline.

In addition to the movements illustrated in Figures 9, 10 and 11, the cutting device is also free to rise and fall as shown in Fig. 12, by reason of its hinge attachment to the cross rail 30. It will be seen that the present invention provides an improved construction wherein the lifting fingers and the cutting device will readily conform to the variations in contour and height of the ground traveled, thereby assuring that the lifting fingers will efficiently gather the crop and that the cutting device will cut the vines close to the ground, as is required. It will also be seen that the prongs 16 hold the vines sufficiently above the cutting device to assure that pendant pods will not be cut open and their seeds lost in the field.

It will be seen that the rise and fall of the cutting device, and changes in the inclination thereof, coact with the lifting finger 15 and with the prong 16 to change their inclination, and that the lifting finger 15 coacts with the prong 16 to change the inclination of the latter, so as to in each instance provide a favorable interrelated inclination for efficient harvesting of the crop. The weight of the crop upon the prongs 16 fully suffices to hold the lifting fingers 15 in contact with the ground and assures a maximum efficiency in gathering fallen vines.

It will be seen that the improved construction provides a continuous and gradual incline support for the vines, and that this support automatically adapts itself to the various movements of the cutting device.

The prongs 16 may be made of sufficient length to assure that their operative movements will not cause them to leave the platform, or if desired, any suitable apron such as E in Fig. 10 may be provided as a forward extension of the platform P, to thereby afford support for the prongs when they move forward and to guide their rearward movement back to the platform.

Should it be desired to convert the device into one having a fixed cutting device, it is a simple matter to suitably thread the post 22 shown in Fig. 10 and employ two nuts 21 and 23 to hold the shoe 19 rigid with the push bar 20, in the manner shown in Fig. 2.

In the present disclosure, I claim as my invention:—

1. A harvester attachment comprising a cutting device, push bars pivoted to said cutting device, means for limiting the pivotal movement of said cutting device, means for hingedly attaching said push bars to a harvester having a platform with said cutting device disposed below and forwardly of said platform, lifting fingers pivoted to said cutting device, gap bridging means cooperating between said platform and said lifting fingers, each gap bridging means pivoted to one of said lifting fingers and forwardly of the pivotal axis of the latter; means for limiting the pivotal movement of said lifting fingers, and means for limiting the hinge movement of said push bars.

2. A harvester attachment comprising a cutting device, push bars connected to said cutting device, means for hingedly attaching said push bars to a harvester having a platform with said cutting device disposed below and forwardly of said platform, means for limiting the hinge movement of said push bars, lifting fingers pivoted to said cutting device, gap bridging means cooperating between said platform and said lifting fingers, each gap bridging means pivoted to one of said lifting fingers and forwardly of the pivotal axis of the latter, the upper edge of each lifting finger inclined downwardly from the pivotal connection of said gap bridging means and the underside of each lifting finger longitudinally arched to a point higher than the cutting device, and means for limiting the pivotal movement of said lifting fingers.

3. A harvester attachment comprising a cutting device, push bars pivoted to said cutting device, means for limiting the pivotal movement of said cutting device, a cross rail for said push bars, the rear end of each push bar hingedly connected to said cross rail, means for attaching said cross rail to a harvester having a platform with the cutting device disposed below and forwardly of said platform, means for limiting the hinge movement of said push bars, lifting fingers pivoted to said device and extending forwardly thereof, gap bridging means pivoted to said lifting fingers and forwardly of the pivotal axis of the latter, said gap bridging means being of sufficient length to extend to said platform and be supported thereby, said lifting fingers having free pivotal movement both above and below the plane of said cutting device, and means to limit the pivotal movement of said lifting fingers.

4. A harvester attachment comprising a cutting device, rearwardly extending push bars connected to said cutting device, a cross rail for said push bars, the rear end of each push bar hingedly connected to said cross rail, U-bolts saddling said cross rail and each provided with a tie plate for clamp attachment to a harvester having a platform, to thereby hingedly dispose said cutting device below and forwardly of said platform, means for supporting the cut crop in its passage from the cutting device to the platform, and means for limiting the hinge movement of said push bars.

5. A harvester attachment comprising a cutting device, rearwardly extending push bars connected to said cutting device, a round cross rail for said push bars, the rear end of each push bar hingedly connected to said cross rail by means of a U-bolt saddling said cross rail and passing through the respective push bar, other U-bolts saddling said cross rail and each provided with a tie plate for clamp attachment to a harvester having a platform, to thereby hingedly dispose said cutting device below and forwardly of said platform, means for supporting the cut crop in its passage from the cutting device to the platform, and means for limiting the hinge movement of said push bars.

6. A harvester attachment comprising a cutting device, skid shoes rigid with said cutting device and extending rearwardly therefrom, an upstanding bracket rigid with each skid shoe, a push bar pivoted to each of said brackets, means to limit the pivotal movement of said skid shoes and cutting device, means for hinging the rear of each push bar to a harvester having a platform and with the cutting device disposed below and forwardly of said platform, a cable connected to each of said brackets at a point above the pivotal connection of said push bars, said cables extending rearwardly and attaching to said platform.

7. A harvester attachment comprising a cutting device having rearwardly extending skid shoes rigid therewith, push bars pivoted to said cutting device and each aligned with one of said skid shoes, a slidable connection between each skid shoe and its respective push bar, said slidable connections adapted to restrict the pivotal movement of said cutting device, means for hingedly attaching the rear of each push bar to a harvester having a platform and with the cutting device disposed below and forwardly of said platform, and cables for connecting said cutting device to said platform.

8. A harvester attachment comprising a cutting device having rearwardly extending skid shoes rigid therewith, push bars pivoted to said cutting device and each aligned with one of said skid shoes, each skid shoe having an upturned end for impingement against its respective push bar, cable connection between each skid shoe and its respective push bar, means for hingedly attaching the rear of each push bar to a harvester having a platform and with the cutting device disposed below and forwardly of said platform, and cables for connecting said cutting device to said platform.

9. In a harvester attachment embodying a cutting device having push bars extending rearwardly therefrom, a round cross rail for said push bars, the rear end of each push bar hingedly connected to said cross rail by means of a U-bolt saddling said cross rail and passing through the respective push bar, other U-bolts saddling said cross rail and each provided with a tie plate for clamp attachment to a harvester.

10. In a harvester attachment embodying a cutting device having push bars extending rearwardly therefrom, a cross rail for said push bars, the rear end of each push bar hingedly connected to said cross rail, U-bolts saddling said cross rail and each provided with a tie plate for clamp attachment to a harvester.

AARON D. EDGINGTON.